United States Patent
Hirayama et al.

(10) Patent No.: US 9,263,763 B2
(45) Date of Patent: Feb. 16, 2016

(54) SULFIDE SOLID ELECTROLYTE MATERIAL, BATTERY, AND PRODUCING METHOD FOR SULFIDE SOLID ELECTROLYTE MATERIAL

(71) Applicants: TOYOTA JIDOSHA KABUSHIKI KAISHA, Toyota-shi, Aichi (JP); TOKYO INSTITUTE OF TECHNOLOGY, Tokyo (JP)

(72) Inventors: Masaaki Hirayama, Yokohama (JP); Ryoji Kanno, Kawasaki (JP); Yuki Kato, Susono (JP); Koji Kawamoto, Miyoshi (JP); Takamasa Otomo, Susono (JP)

(73) Assignees: TOYOTA JIDOSHA KABUSHIKI KAISHA, Toyota (JP); TOKYO INSTITUTE OF TECHNOLOGY, Tokyo (JP)

(*) Notice: Subject to any disclaimer, the term of this patent is extended or adjusted under 35 U.S.C. 154(b) by 61 days.

(21) Appl. No.: 14/365,950

(22) PCT Filed: Dec. 21, 2012

(86) PCT No.: PCT/JP2012/083350
§ 371 (c)(1),
(2) Date: Jun. 16, 2014

(87) PCT Pub. No.: WO2013/094757
PCT Pub. Date: Jun. 27, 2013

(65) Prior Publication Data
US 2014/0363745 A1 Dec. 11, 2014

(30) Foreign Application Priority Data

Dec. 22, 2011 (JP) .................. 2011-281179
Oct. 23, 2012 (JP) .................. 2012-234153

(51) Int. Cl.
$H01M$ $10/0562$ (2010.01)
$H01M$ $4/13$ (2010.01)
(Continued)

(52) U.S. Cl.
CPC ........... $H01M$ $10/0562$ (2013.01); $C01B$ $17/20$ (2013.01); $C01G$ $17/006$ (2013.01);
(Continued)

(58) Field of Classification Search
None
See application file for complete search history.

(56) References Cited

U.S. PATENT DOCUMENTS 8,697,292 B2 * 4/2014 Kanno .................. C01B 17/20
429/304
2006/0292449 A1 12/2006 Ota
(Continued)

FOREIGN PATENT DOCUMENTS

JP     A-2007-12324        1/2007
JP     2007273217 A     * 10/2007
(Continued)

OTHER PUBLICATIONS

JP 2007273217 A EN Translation 2007.*
(Continued)

*Primary Examiner* — Patrick Ryan
*Assistant Examiner* — Lucas J O Donnell
(74) *Attorney, Agent, or Firm* — Oliff PLC

(57) ABSTRACT

The object of the present invention is to provide a sulfide solid electrolyte material with favorable ion conductivity. The present invention attains the object by providing a sulfide solid electrolyte material including an $M_1$ element (such as a Li element), an $M_2$ element (such as a Ge element and a P element), a S element and an O element, and having a peak at a position of $2\theta=29.58°\pm0.50°$ in an X-ray diffraction measurement using a CuKα ray, characterized in that when a diffraction intensity at the peak of $2\theta=29.58°\pm0.50°$ is regarded as $I_A$ and a diffraction intensity at a peak of $2\theta=27.33°\pm0.50°$ is regarded as $I_B$, a value of $I_B/I_A$ is less than 0.50.

8 Claims, 6 Drawing Sheets

UPPER ROW: SULFIDE SOLID ELECTROLYTE MATERIAL WITH HIGH ION CONDUCTIVITY
LOWER ROW: SULFIDE SOLID ELECTROLYTE MATERIAL WITH LOW ION CONDUCTIVITY

(51) Int. Cl.
*H01M 10/052* (2010.01)
*H01B 1/10* (2006.01)
*C01B 17/20* (2006.01)
*C01G 17/00* (2006.01)

(52) U.S. Cl.
CPC ............... *H01B 1/10* (2013.01); *H01M 4/13* (2013.01); *H01M 10/052* (2013.01); *C01P 2002/72* (2013.01); *C01P 2002/74* (2013.01); *C01P 2002/77* (2013.01); *H01M 2300/0068* (2013.01); *Y02E 60/122* (2013.01); *Y02T 10/7011* (2013.01)

(56) References Cited

U.S. PATENT DOCUMENTS

| | | | |
|---|---|---|---|
| 2007/0264579 A1* | 11/2007 | Ota | H01M 2/145 429/322 |
| 2011/0167625 A1* | 7/2011 | Hama | H01M 10/052 29/623.1 |
| 2012/0189918 A1 | 7/2012 | Tatsumisago et al. | |
| 2013/0040208 A1 | 2/2013 | Kanno et al. | |

FOREIGN PATENT DOCUMENTS

| | | |
|---|---|---|
| JP | A-2007-273214 | 10/2007 |
| JP | A-2007-273217 | 10/2007 |
| JP | A-2007-305552 | 11/2007 |
| JP | A-2011-57500 | 3/2011 |
| JP | A-2012-89424 | 5/2012 |
| WO | WO 2010/038313 A1 | 4/2010 |
| WO | WO 2011/118801 A1 | 9/2011 |

OTHER PUBLICATIONS

Kanno et al., "Lithium Ionic Conductor Thio-LISICON: The $Li_2S$—$GeS_2$—$P_2S_5$ System," *Journal of the Electrochemical Society*, Jun. 5, 2001, pp. A742-A746, vol. 148.

Kamaya et al., "A lithium superionic conductor," *Nature Materials*, Jul. 31, 2011, pp. 1-5.

Takada et al., "Lithium ion conductive oxysulfide, $Li_3PO_4$—$Li_3PS_4$," *Solid State Ionics*, 2005, pp. 2355-2359, vol. 176.

* cited by examiner

UPPER ROW: SULFIDE SOLID ELECTROLYTE MATERIAL WITH HIGH ION CONDUCTIVITY
LOWER ROW: SULFIDE SOLID ELECTROLYTE MATERIAL WITH LOW ION CONDUCTIVITY

OCTAHEDRON O
(SUCH AS $LiS_{6-x}O_x$)

TETRAHEDRON $T_1$
(SUCH AS $GeS_{4-x}O_x$ AND $PS_{4-x}O_x$)

TETRAHEDRON $T_2$
(SUCH AS $PS_{4-x}O_x$)

SULFIDE SOLID ELECTROLYTE MATERIAL, BATTERY, AND PRODUCING METHOD FOR SULFIDE SOLID ELECTROLYTE MATERIAL

TECHNICAL FIELD

The present invention relates to a sulfide solid electrolyte material with favorable ion conductivity.

BACKGROUND ART

In accordance with a rapid spread of information relevant apparatuses and communication apparatuses such as a personal computer, a video camera and a portable telephone in recent years, the development of a battery to be utilized as a power source thereof has been emphasized. The development of a high-output and high-capacity battery for an electric automobile or a hybrid automobile has been advanced also in the automobile industry. A lithium battery has been presently noticed from the viewpoint of a high energy density among various kinds of batteries.

Liquid electrolyte containing a flammable organic solvent is used for a presently commercialized lithium battery, so that the installation of a safety device for restraining temperature rise during a short circuit and the improvement in structure and material for preventing the short circuit are necessary therefor. On the contrary, a lithium battery all-solidified by replacing the liquid electrolyte with a solid electrolyte layer is conceived to intend the simplification of the safety device and be excellent in production cost and productivity for the reason that the flammable organic solvent is not used in the battery.

A sulfide solid electrolyte material is known as a solid electrolyte material used for an all solid lithium battery. For example, in Non Patent Literature 1, a Li ion conductor (a sulfide solid electrolyte material) having a composition of $Li_{(4-x)}Ge_{(1-x)}P_xS_4$ is disclosed. Also, in Patent Literature 1, an LiGePS-based sulfide solid electrolyte material having a specific peak in X-ray diffraction measurement is disclosed. In addition, in Non Patent Literature 2, an LiGePS-based sulfide solid electrolyte material is disclosed.

CITATION LIST

Patent Literature

Patent Literature 1: WO 2011/118801

Non Patent Literature

Non Patent Literature 1: Ryoji Kanno et al., "Lithium Ionic Conductor Thio-LISICON The $Li_2S$—$GeS_2$—$P_2S_5$ System", Journal of The Electrochemical Society, 148 (7) A742-A746 (2001)
Non Patent Literature 2: Noriaki Kamaya et al., "A lithium superionic conductor", Nature Materials, Advanced online publication, 31 Jul. 2011, DOI:10.1038/NMAT3066

SUMMARY OF INVENTION

Technical Problem

A solid electrolyte material with favorable ion conductivity is demanded from the viewpoint of achieving higher output of a battery. The present invention has been made in view of the above-mentioned actual circumstances, and the main object thereof is to provide a sulfide solid electrolyte material with favorable ion conductivity.

Solution to Problem

In order to solve the above-mentioned problems, the present invention provides a sulfide solid electrolyte material comprising an $M_1$ element, an $M_2$ element, a S element and an O element, characterized in that the above-mentioned $M_1$ contains at least Li; the above-mentioned $M_2$ is at least one kind selected from the group consisting of P, Sb, Si, Ge, Sn, B, Al, Ga, In, Zr, V and Nb; and having a peak at a position of $2\theta=29.58°\pm0.50°$ in an X-ray diffraction measurement using a CuKα ray, characterized in that when a diffraction intensity at the above-mentioned peak of $2\theta=29.58°\pm0.50°$ is regarded as $I_A$ and a diffraction intensity at a peak of $2\theta=27.33°\pm0.50°$ is regarded as $I_B$, a value of $I_B/I_A$ is less than 0.50.

According to the present invention, the ratio of a crystal phase having a peak in the vicinity of $2\theta=29.58°$ is so high as to allow the sulfide solid electrolyte material with favorable ion conductivity. In addition, the introduction of the O element into the sulfide solid electrolyte material comprising the $M_1$ element, the $M_2$ element and the S element allows the sulfide solid electrolyte material with ion conductivity further improved.

Also, the present invention provides a sulfide solid electrolyte material comprising an $M_1$ element, an $M_2$ element, a S element and an O element, characterized in that the above-mentioned $M_1$ contains at least Li and the above-mentioned $M_2$ is at least one kind selected from the group consisting of P, Sb, Si, Ge, Sn, B, Al, Ga, In, Ti, Zr, V and Nb; and having a peak at a position of $2\theta=29.58°\pm0.50°$ in an X-ray diffraction measurement using a CuKα ray, characterized by not having a peak at a position of $2\theta=27.33°\pm0.50°$ in the X-ray diffraction measurement using the CuKα ray, or characterized in that when a diffraction intensity at the above-mentioned peak of $2\theta=29.58°\pm0.50°$ is regarded as $I_A$ and a diffraction intensity at the above-mentioned peak of $2\theta=27.33°\pm0.50°$ is regarded as $I_B$ in the case of having a peak at the above-mentioned position of $2\theta=27.33°\pm0.50°$, a value of $I_B/I_A$ is less than 0.50.

According to the present invention, the ratio of a crystal phase having a peak in the vicinity of $2\theta=29.58°$ is so high as to allow the sulfide solid electrolyte material with favorable ion conductivity. In addition, the introduction of O element into the sulfide solid electrolyte material comprising the $M_1$ element, the $M_2$ element and the S element allows the sulfide solid electrolyte material with ion conductivity further improved.

Also, the present invention provides a sulfide solid electrolyte material comprising an octahedron O composed of an $M_1$ element and a S element, a tetrahedron $T_1$ composed of an $M_{2a}$ element and a S element, and a tetrahedron $T_2$ composed of an $M_{2b}$ element and a S element, characterized in that the above-mentioned tetrahedron $T_1$ and the above-mentioned octahedron O share an edge, the above-mentioned tetrahedron $T_2$ and the above-mentioned octahedron O contain a crystal structure sharing a corner as the main body; the above-mentioned $M_1$ contains at least Li; the above-mentioned $M_{2a}$ and the above-mentioned $M_{2b}$ are each independently at least one kind selected from the group consisting of P, Sb, Si, Ge, Sn, B, Al, Ga, In, Ti, Zr, V and Nb; and at least one of the above-mentioned octahedron O, the above-mentioned tetrahedron $T_1$ and the above-mentioned tetrahedron $T_2$ is such that a part of the above-mentioned S element is substituted with an O element.

According to the present invention, the octahedron O, the tetrahedron $T_1$ and the tetrahedron $T_2$ have a predetermined crystal structure (a three-dimensional structure), so as to allow the sulfide solid electrolyte material with favorable ion conductivity. At least one of the octahedron O, the tetrahedron $T_1$ and the tetrahedron $T_2$ is such that a part of the S element is substituted with O element, so as to allow the sulfide solid electrolyte material with ion conductivity further improved.

In the above-mentioned invention, it is preferable that the sulfide solid electrolyte material comprises at least a Li element, a Ge element, a P element, the S element and the O element, and the ratio of the above-mentioned O element to the total of the above-mentioned S element and the above-mentioned O element is 25% or less. The reason therefor is to allow the sulfide solid electrolyte material having higher ion conductivity.

In the above-mentioned invention, it is preferable that the sulfide solid electrolyte material comprises at least a Li element, a Si element, a P element, the S element and the O element, and the ratio of the above-mentioned O element to the total of the above-mentioned S element and the above-mentioned O element is 10% or less. The reason therefor is to allow the sulfide solid electrolyte material having higher ion conductivity.

Also, the present invention provides a battery containing a cathode active material layer containing a cathode active material, an anode active material layer containing an anode active material, and an electrolyte layer formed between the above-mentioned cathode active material layer and the above-mentioned anode active material layer, characterized in that at least one of the above-mentioned cathode active material layer, the above-mentioned anode active material layer and the above-mentioned electrolyte layer contains the above-mentioned sulfide solid electrolyte material.

According to the present invention, the use of the above-mentioned sulfide solid electrolyte material allows the high-output battery.

Also, the present invention provides a producing method for a sulfide solid electrolyte material having the above-mentioned peak intensity ratio, comprising steps of: an ion conductive material synthesizing step of synthesizing an amorphized ion conductive material by mechanical milling while using a raw material composition containing the above-mentioned $M_1$ element, the above-mentioned $M_2$ element, the above-mentioned S element and the above-mentioned O element, and a heating step of obtaining the above-mentioned sulfide solid electrolyte material by heating the above-mentioned amorphized ion conductive material.

According to the present invention, amorphization is performed in the ion conductive material synthesizing step to thereafter perform the heating step, so as to allow the sulfide solid electrolyte material such that the ratio of a crystal phase having a peak in the vicinity of $2\theta=29.58°$ is high. Thus, the sulfide solid electrolyte material with favorable ion conductivity may be obtained. In addition, the inclusion of the O element in the raw material composition allows the sulfide solid electrolyte material with ion conductivity further improved.

Also, the present invention provides a producing method for a sulfide solid electrolyte material having the above-mentioned crystal structure, the method comprising steps of: an ion conductive material synthesizing step of synthesizing an amorphized ion conductive material by mechanical milling while using a raw material composition containing the above-mentioned $M_1$ element, the above-mentioned $M_{2a}$ element, the above-mentioned $M_{2b}$ element, the above-mentioned S element and the above-mentioned O element, and a heating step of obtaining the above-mentioned sulfide solid electrolyte material by heating the above-mentioned amorphized ion conductive material.

According to the present invention, amorphization is performed in the ion conductive material synthesizing step to thereafter perform the heating step, so as to allow the sulfide solid electrolyte material such that the octahedron O, the tetrahedron $T_1$ and the tetrahedron $T_2$ have a predetermined crystal structure (a three-dimensional structure). Thus, the sulfide solid electrolyte material with favorable ion conductivity may be obtained. In addition, the inclusion of the O element in the raw material composition allows the sulfide solid electrolyte material with ion conductivity further improved.

Advantageous Effects of Invention

The present invention produces the effect such as to allow a sulfide solid electrolyte material with favorable ion conductivity.

DESCRIPTION OF EMBODIMENTS

A sulfide solid electrolyte material, a battery and a producing method for a sulfide solid electrolyte material of the present invention are hereinafter described in detail.

A. Sulfide Solid Electrolyte Material

First, a sulfide solid electrolyte material of the present invention is described. The sulfide solid electrolyte material of the present invention may be roughly divided into two embodiments. Then, the sulfide solid electrolyte material of the present invention is described while divided into a first embodiment and a second embodiment.

1. First Embodiment

A sulfide solid electrolyte material of a first embodiment contains an $M_1$ element, an $M_2$ element, a S element and an O element, characterized in that the $M_1$ contains at least Li and the $M_2$ is at least one kind selected from the group consisting of P, Sb, Si, Ge, Sn, B, Al, Ga, In, Ti, Zr, V and Nb, and has a peak at a position of $2\theta=29.58°\pm0.50°$ in an X-ray diffraction measurement using a CuKα ray, and characterized in that when a diffraction intensity at the above-mentioned peak of $2\theta=29.58°\pm0.50°$ is regarded as $I_A$ and a diffraction intensity at a peak of $2\theta=27.33°\pm0.50°$ is regarded as $I_B$, a value of $I_B/I_A$ is less than 0.50.

According to the first embodiment, the ratio of a crystal phase having a peak in the vicinity of $2\theta=29.58°$ is so high as to allow the sulfide solid electrolyte material with favorable ion conductivity. In addition, the introduction of the O element into the sulfide solid electrolyte material having the $M_1$ element, the $M_2$ element and the S element allows the sulfide solid electrolyte material with ion conductivity further improved. Thus, the use of the sulfide solid electrolyte material of the first embodiment allows a high-output battery. The reason why ion conductivity is improved is conceived to be that the introduction of the O element causes the size of a tunnel through which an Li ion passes (a tunnel existing in a crystal) to change into a size for allowing easier conduction.

Figure 1:
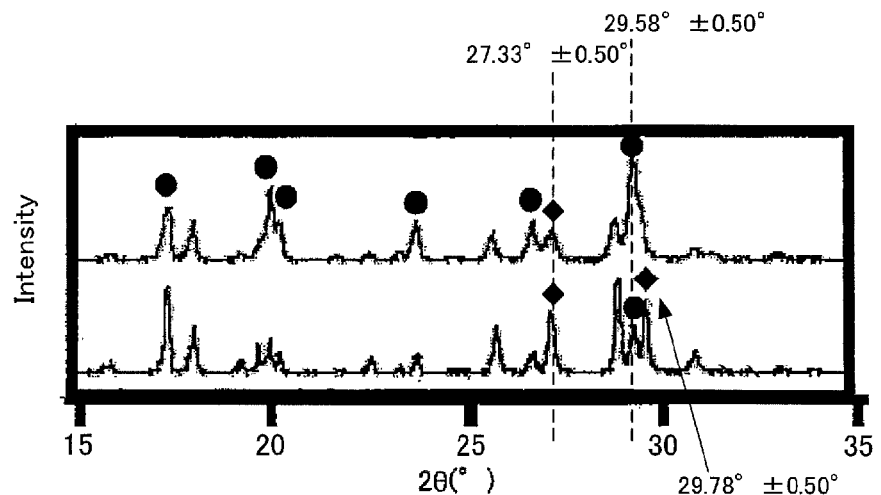
FIG. 1 is an X-ray diffraction spectrum explaining a difference between a sulfide solid electrolyte material with high ion conductivity and a sulfide solid electrolyte material with low ion conductivity.

FIG. 1 is an X-ray diffraction spectrum explaining a difference between a sulfide solid electrolyte material with high ion conductivity and a sulfide solid electrolyte material with low ion conductivity. Incidentally, both of the two sulfide solid electrolyte materials in FIG. 1 have a composition of $Li_{3.25}Ge_{0.25}P_{0.75}S_4$. In FIG. 1, the sulfide solid electrolyte material with high ion conductivity has a peak at a position of $2\theta=29.58°\pm0.50°$ and a position of $2\theta=27.33°\pm0.50°$. Also, in FIG. 1, the sulfide solid electrolyte material with low ion conductivity has the same peak. Here, it is conceived that a crystal phase having a peak in the vicinity of $2\theta=29.58°$ and a crystal phase having a peak in the vicinity of $2\theta=27.33°$ are crystal phases different from each other. Incidentally, in the first embodiment, the crystal phase having a peak in the vicinity of $2\theta=29.58°$ and the crystal phase having a peak in the vicinity of $2\theta=27.33°$ are occasionally referred to as 'crystal phase A' and 'crystal phase B', respectively. Incidentally, this sulfide solid electrolyte material with high ion conductivity has the same crystal structure as the sulfide solid electrolyte material of the first embodiment, as described later.

Both of the crystal phases A and B are crystal phases exhibiting ion conductivity, which is different. The crystal phase A is conceived to be remarkably high in ion conductivity as compared with the crystal phase A conventional synthesis method (such as a solid-phase method) has not been capable of decreasing the ratio of the crystal phase B with low ion conductivity, and has not been capable of sufficiently heightening ion conductivity. On the contrary, in the first embodiment, the crystal phase A with high ion conductivity may be precipitated so positively as to allow the sulfide solid electrolyte material with high ion conductivity.

Also, in the first embodiment, in order to distinguish from the sulfide solid electrolyte material with low ion conductivity, a diffraction intensity at a peak in the vicinity of $2\theta=29.58°$ is regarded as $I_A$ and a diffraction intensity at a peak in the vicinity of $2\theta=27.33°$ is regarded as $I_B$, and a value of $I_B/I_A$ is prescribed at less than 0.50. Incidentally, it is conceived that a conventional synthesis method has not allowed the sulfide solid electrolyte material such that a value of $I_B/I_A$ is less than 0.50. Also, from the viewpoint of ion conductivity, the sulfide solid electrolyte material in the first embodiment is preferably high in the ratio of the crystal phase A with high ion conductivity. Thus, a value of $I_B/I_A$ is preferably smaller; specifically, preferably 0.45 or less, more preferably 0.25 or less, far more preferably 0.15 or less, and particularly preferably 0.07 or less. Also, a value of $I_B/I_A$ is preferably 0. In other words, it is preferable that the sulfide solid electrolyte material of the first embodiment does not have a peak in the vicinity of $2\theta=27.33°$ as a peak of the crystal phase B.

The sulfide solid electrolyte material of the first embodiment has a peak in the vicinity of $2\theta=29.58°$. This peak is one of the peaks of the crystal phase A with high ion conductivity, as described above. Here, $2\theta=29.58°$ is an actual measurement value, and a crystal lattice changes somewhat due to material composition, or the like so that a position of the peak occasionally shifts somewhat from $2\theta=29.58°$. Thus, in the first embodiment, the above-mentioned peak of the crystal phase A is defined as a peak at a position of $2\theta=29.58°\pm0.50°$. The crystal phase A is ordinarily conceived to have peaks of $2\theta=17.38°$, $20.18°$, $20.44°$, $23.56°$, $23.96°$, $24.93°$, $26.96°$, $29.07°$, $29.58°$, $31.71°$, $32.66°$ and $33.39°$. Incidentally, also these peak positions occasionally shift in a range of $\pm0.50°$.

On the other hand, the peak in the vicinity of $2\theta=27.33°$ is one of the peaks of the crystal phase B with low ion conductivity, as described above. Here, $2\theta=27.33°$ is an actual measurement value, and a crystal lattice changes somewhat due to material composition or the like, so that a position of the peak occasionally shifts somewhat from $2\theta=27.33°$. Thus, in the first embodiment, the above-mentioned peak of the crystal phase B is defined as a peak at a position of $2\theta=27.33°\pm0.50°$. The crystal phase B is ordinarily conceived to have peaks of $2\theta=17.46°$, $18.12°$, $19.99°$, $22.73°$, $25.72°$, $27.33°$, $29.16°$ and $29.78°$. Incidentally, also these peak positions occasionally shift in a range of $\pm0.50°$.

Also, the sulfide solid electrolyte material of the first embodiment comprises an $M_1$ element, an $M_2$ element, a S element and an O element. The above-mentioned $M_1$ is not particularly limited if the $M_1$ contains at least Li, but may be only Li or a combination of Li and another element. Another element is, for example, preferably a monovalent or divalent element, specifically, preferably at least one kind selected from the group consisting of Na, K, Mg, Ca and Zn. Also, the above-mentioned $M_1$ may be a monovalent element (such as Li, Na and K), which is partially substituted with a divalent or more element (such as Mg, Ca and Zn). Thus, a monovalent element moves so easily as to improve ion conductivity.

On the other hand, the above-mentioned $M_2$ is preferably a trivalent, tetravalent or pentavalent element. Examples of the above-mentioned $M_2$ include one kind selected from the group consisting of P, Sb, Si, Ge, Sn, B, Al, Ga, In, Ti, Zr, V and Nb. Above all, in the first embodiment, the above-mentioned $M_2$ preferably contains at least one kind selected from the group consisting of P, Si, Ge, Al, Zr, Sn and B, and contains at least P and Ge or at least P and Si more preferably.

Also, the sulfide solid electrolyte material of the first embodiment contains the S element and the O element. The ratio of the O element contained in the sulfide solid electrolyte material is preferably a ratio such as to allow higher ion conductivity than ion conductivity of the same sulfide solid electrolyte material except for adjusting valence number with S without containing the O element (a sulfide solid electrolyte material as comparison purpose). Incidentally, the sulfide solid electrolyte material as comparison purpose corresponds to $Li_{3.35}Ge_{0.35}P_{0.65}S_4$ in the case where the sulfide solid electrolyte material of the first embodiment is $Li_{3.35}Ge_{0.35}P_{0.65}(S_{1-y}O_y)_4$, for example. Here, the ratio of the O element to the total of the S element and the O element is, for example, preferably 0.1% or more, more preferably 0.5% or more, and far more preferably 1% or more. On the other hand, the above-mentioned ratio of the O element is, for example, preferably 25% or less. The reason therefor is to allow the sulfide solid electrolyte material having higher ion conductivity. Also, the above-mentioned ratio of the O element may be determined by XPS and EDX, for example.

Also, in the after-mentioned examples, an LiGePSO-based sulfide solid electrolyte material is really synthesized and X-ray diffraction measurement of an obtained sample is performed to confirm that $T_B/I_A$ is a predetermined value or less. This LiGePSO-based sulfide solid electrolyte material is such that the $M_1$ element corresponds to the Li element and the $M_2$ element corresponds to the Ge element and the P element in the above-mentioned general formula. On the other hand, the sulfide solid electrolyte material of the first embodiment ordinarily has a specific crystal structure described in the after-mentioned second embodiment. It is guessed that an optional combination of the $M_1$ element and the $M_2$ element may offer the same crystal structure as the LiGePSO-based sulfide solid electrolyte material. Thus, it is conceived that any optional combination of the $M_1$ element and the $M_2$ element allows the sulfide solid electrolyte material with favorable ion conductivity. Also, a position of a peak in X-ray diffraction depends on a crystal structure, so that it is conceived that a similar XRD pattern is obtained irrespective of kinds of the $M_1$ element and the $M_2$ element if the sulfide solid electrolyte material has the above-mentioned crystal structure.

Also, the sulfide solid electrolyte material of the first embodiment preferably contains at least a Li element, a Ge element, a P element, a S element and an O element. In this case, as described above, the ratio of the O element to the total of the S element and the O element is, for example, preferably 0.1% or more, more preferably 0.5% or more, and far more preferably 1% or more. On the other hand, the above-mentioned ratio of O element is, for example, preferably 25% or less.

The composition of the LiGePSO-based sulfide solid electrolyte material is not particularly limited if the composition is a composition such as to allow a predetermined value of $I_B/I_A$, but is preferably a composition of $Li_{(4-x)}Ge_{(1-x)}P_x(S_{1-y}O_y)_4$ ("x" satisfies 0<x<1 and "y" satisfies 0<y≤0.25). The reason therefor is to allow the sulfide solid electrolyte material with high ion conductivity. Here, a composition of $Li_{(4-x)}Ge_{(1-x)}P_xS_4$ not having O element corresponds to a composition of a solid solution of $Li_3PS_4$ and $Li_4GeS_4$. That is to say, this composition corresponds to a composition on a tie line of $Li_3PS_4$ and $Li_4GeS_4$. Incidentally, both $Li_3PS_4$ and $Li_4GeS_4$ correspond to an ortho-composition and have the advantage that chemical stability is high. The sulfide solid electrolyte material having such a composition of $Li_{(4-x)}Ge_{(1-x)}P_xS_4$ has been conventionally known as thio-LISICON, and the sulfide solid electrolyte material of the first embodiment may be identical with conventional thio-LISICON in composition. However, as described above, the ratio of a crystal phase contained in the sulfide solid electrolyte material of the first embodiment is entirely different from the ratio of a conventional crystal phase. In addition, the sulfide solid electrolyte material of the first embodiment has the advantage that ion conductivity is further high by reason of containing the O element.

Also, "x" in $Li_{(4-x)}Ge_{(1-x)}P_x(S_{1-y}O_y)_4$ is not particularly limited if the "x" is a value such as to allow a predetermined value of $I_B/I_A$, but satisfies preferably 0.4≤x, and more preferably 0.5≤x, for example. On the other hand, the above-mentioned x satisfies preferably x≤0.8, and more preferably x≤0.75. The reason therefor is that such a range of "x" allows a value of $I_B/I_A$ to be further decreased. The above-mentioned "y" satisfies preferably 0.001≤y, more preferably 0.005≤y, and far more preferably 0.01≤y. On the other hand, the above-mentioned y preferably satisfies y≤0.25. Thus, the sulfide solid electrolyte material with further favorable ion conductivity may be obtained. Also, the sulfide solid electrolyte material of the first embodiment is preferably obtained by using at least $Li_2S$, $P_2S_5$ and $GeS_2$.

Also, the sulfide solid electrolyte material of the first embodiment preferably contains at least the Li element, the Si element, the P element, the S element and the O element. In this case, the ratio of the O element to the total of the S element and the O element is, for example, preferably 0.1% or more, more preferably 0.5% or more, and far more preferably 1% or more. On the other hand, the above-mentioned ratio of the O element is, for example, preferably 20% or less, more preferably 15% or less, and far more preferably 10% or less.

In addition, the composition of the LiSiPSO-based sulfide solid electrolyte material is not particularly limited if the composition is a composition such as to allow a predetermined value of $I_B/I_A$, but is preferably a composition of $Li_{(4-x)}Si_{(1-x)}P_x(S_{1-y}O_y)$ ("x" satisfies 0<x<1 and y satisfies 0<y≤0.25). The reason therefor is to allow the sulfide solid electrolyte material with high ion conductivity. Here, a composition of $Li_{(4-x)}Si_{(1-x)}P_xS_4$ not having O element corresponds to a composition of a solid solution of $Li_3PS_4$ and $Li_4SiS_4$. That is to say, this composition corresponds to a composition on a tie line of $Li_3PS_4$ and $Li_4SiS_4$. Incidentally, both $Li_3PS_4$ and $Li_4SiS_4$ correspond to an ortho-composition and have the advantage that chemical stability is high.

Also, "x" in $Li_{(4-x)}Si_{(1-x)}P_x(S_{1-y}O_y)_4$ is not particularly limited if the "x" is a value such as to allow a predetermined value of $I_B/I_A$, but satisfies preferably 0.4≤x, and more preferably 0.5≤x, for example. On the other hand, the above-mentioned "x" satisfies preferably x≤0.8, and more preferably x≤0.75. The reason therefor is that such a range of "x" allows a value of $I_B/I_A$ to be further decreased. The above-mentioned "y" satisfies preferably 0.001≤y, more preferably 0.005≤y, and far more preferably 0.01≤y. On the other hand, the above-mentioned "y" preferably satisfies y≤0.2, more preferably y≤0.15, and far more preferably y≤0.1. Also, the sulfide solid electrolyte material of the first embodiment is preferably obtained by using at least $Li_2S$, $P_2S_5$ and $SiS_2$.

The sulfide solid electrolyte material of the first embodiment is ordinarily a crystalline sulfide solid electrolyte material. Also, the sulfide solid electrolyte material of the first embodiment is preferably high in ion conductivity, and ion conductivity of the sulfide solid electrolyte material at 25° C. is preferably $1.0 \times 10^{-3}$ S/cm or more, and more preferably $2.3 \times 10^{-3}$ S/cm or more. Also, the shape of the sulfide solid electrolyte material of the first embodiment is not particularly limited but examples thereof include a powdery shape. In addition, the average particle diameter of the powdery sulfide solid electrolyte material is preferably within a range of 0.1 μm to 50 μm, for example.

The sulfide solid electrolyte material of the first embodiment has so high ion conductivity as to be capable of being used for optional uses in which ion conductivity is required. Above all, the sulfide solid electrolyte material of the first embodiment is preferably used for a battery. The reason therefor is to be capable of greatly contributing to achieving higher output of a battery. Also, a producing method for the sulfide solid electrolyte material of the first embodiment is described in detail in the after-mentioned 'C. Producing method for sulfide solid electrolyte material'. Also, the sulfide solid electrolyte material of the first embodiment may also have characteristics of the after-mentioned second embodiment together.

Incidentally, the first embodiment may provide a sulfide solid electrolyte material comprising the $M_1$ element, the $M_2$ element, the S element and the O element, characterized in that the above-mentioned $M_1$ contains at least Li and the above-mentioned $M_2$ is at least one kind selected from the group consisting of P, Sb, Si, Ge, Sn, B, Al, Ga, In, Ti, Zr, V and Nb, and having a peak at a position of $2\theta=29.58°\pm0.50°$ in an X-ray diffraction measurement using a CuKα ray, characterized by not having a peak at a position of $2\theta=27.33°\pm0.50°$ in an X-ray diffraction measurement using a CuKα ray, or characterized in that when a diffraction intensity at the above-mentioned peak of $2\theta=29.58°\pm0.50°$ is regarded as $I_A$ and a diffraction intensity at the above-mentioned peak of $2\theta=27.33°\pm0.50°$ is regarded as $I_B$ in the case of having a peak at the above-mentioned position of $2\theta=27.33°\pm0.50°$, a value of $I_B/I_A$ is less than 0.50. It is obvious from the above-mentioned description that the sulfide solid electrolyte material of the first embodiment includes the case of not having a peak in the vicinity of $2\theta=27.33°$ as a peak of the crystal phase B; this expression allows the case of not having a peak in the vicinity of $2\theta=27.33°$ to be prescribed further definitely.

2. Second Embodiment

Next, a second embodiment of a sulfide solid electrolyte material of the present invention is described. The sulfide solid electrolyte material of the second embodiment has an octahedron O composed of an $M_1$ element and a S element, a tetrahedron $T_1$ composed of an $M_{2a}$ element and a S element, and a tetrahedron $T_2$ composed of an $M_{2b}$ element and a S element, characterized in that the above-mentioned tetrahedron $T_1$ and the above-mentioned octahedron O share an edge, the above-mentioned tetrahedron $T_2$ and the above-mentioned octahedron O contain a crystal structure sharing a corner as the main body, the above-mentioned $M_1$ contains at least Li, the above-mentioned $M_{2a}$ and the above-mentioned $M_{2b}$ are each independently at least one kind selected from the group consisting of P, Sb, Si, Ge, Sn, B, Al, Ga, In, Ti, Zr, V and Nb, and at least one of the above-mentioned octahedron O, the above-mentioned tetrahedron $T_1$ and the above-mentioned tetrahedron $T_2$ is such that part of the above-mentioned S element is substituted with an O element.

According to the second embodiment, the octahedron O, the tetrahedron $T_1$ and the tetrahedron $T_2$ have a predetermined crystal structure (a three-dimensional structure), so as to allow the sulfide solid electrolyte material with favorable ion conductivity. At least one of the octahedron O, the tetrahedron $T_1$ and the tetrahedron $T_2$ is such that part of the S element is substituted with the O element, so as to allow the sulfide solid electrolyte material with ion conductivity further improved. Thus, the use of the sulfide solid electrolyte material of the second embodiment allows a high-output battery.

Figure 2:
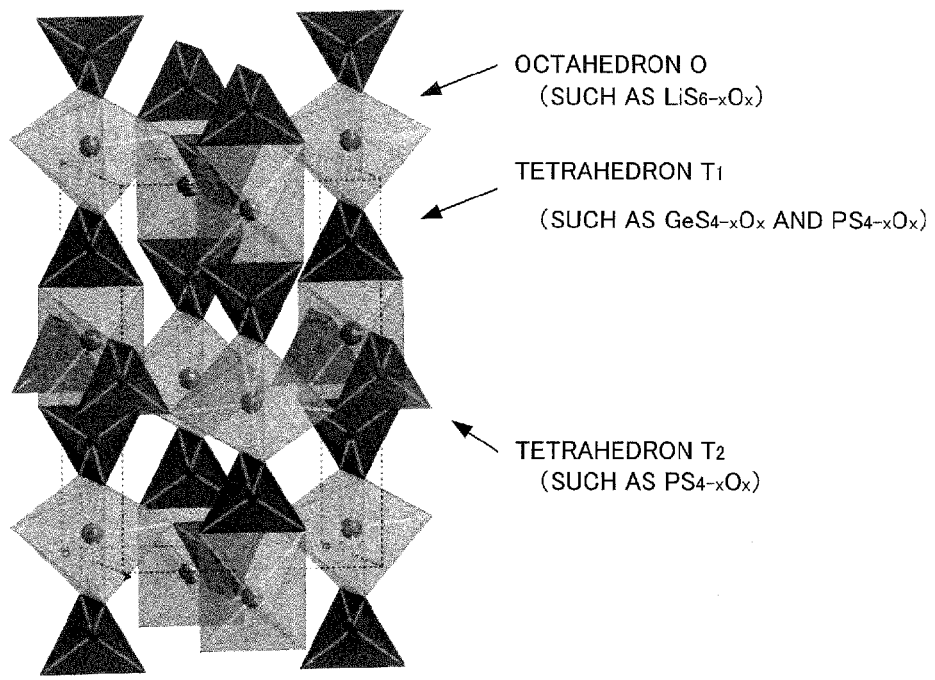
FIG. 2 is a perspective view explaining an example of a crystal structure of a sulfide solid electrolyte material of the present invention.

FIG. 2 is a perspective view explaining an example of a crystal structure of the sulfide solid electrolyte material of the second embodiment. In the crystal structure shown in FIG. 2, the octahedron O has $M_1$ as the central element, and has six pieces of S (incidentally, part of S may be substituted with O) at the corner of the octahedron; typically, $LiS_{6-x}O_x$ ($0 \leq x < 6$) octahedron. The tetrahedron $T_1$ has $M_{2a}$ as the central element, and has four pieces of S (incidentally, part of S may be substituted with O) at the corner of the tetrahedron; typically, both $GeS_{4-x}O_x$ ($0 \leq x < 4$) tetrahedron and $PS_{4-x}O_x$ ($0 \leq x < 4$) tetrahedron. The tetrahedron $T_2$ has $M_{2b}$ as the central element, and has four pieces of S (incidentally, part of S may be substituted with O) at the corner of the tetrahedron; typically, $PS_{4-x}O_x$ ($0 \leq x < 4$) tetrahedron. With regard to the sulfide solid electrolyte material of the second embodiment, at least one of the octahedron O, the tetrahedron $T_1$ and the tetrahedron $T_2$ is such that part of the S element is substituted with O element. Incidentally, it may be confirmed by XRD pattern analysis and neutron diffraction through Rietveld method that part of the S element is substituted with the O element. In addition, the tetrahedron $T_1$ and the octahedron O share an edge, and the tetrahedron $T_2$ and the octahedron O share a corner.

Figure 3:
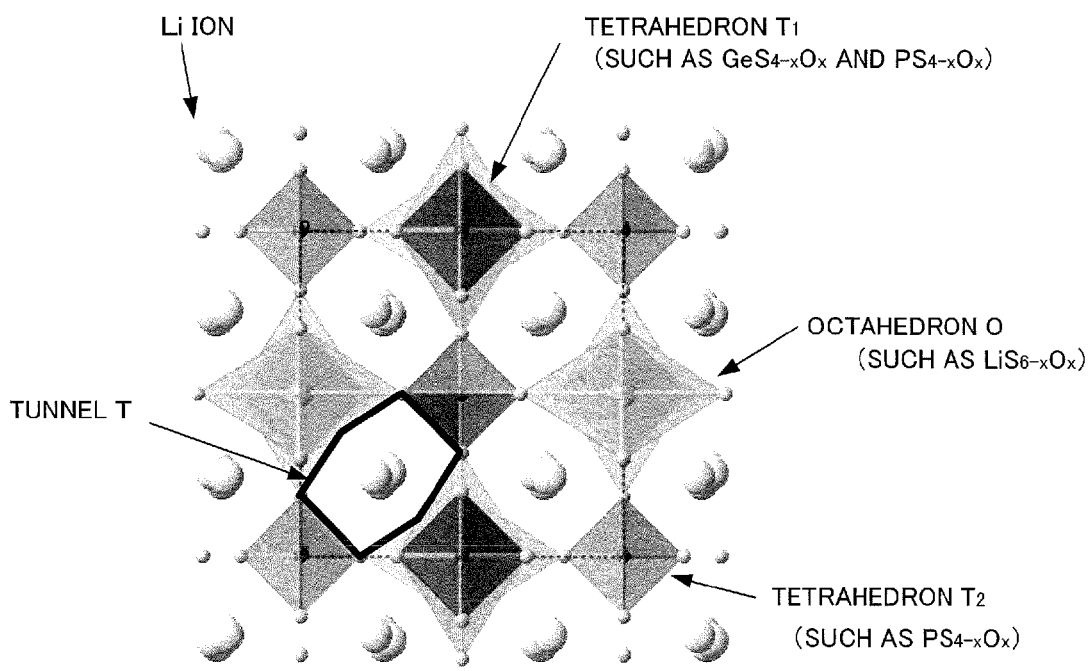
FIG. 3 is a plan view explaining ion conduction in the present invention.

FIG. 3 is a plan view explaining ion conduction in the second embodiment. In FIG. 3, an Li ion conducts in c-axis direction (a vertical direction to the paper plane) through the inside (tunnel T) of the crystal structure composed of the octahedron O, the tetrahedron $T_1$ and the tetrahedron $T_2$. Incidentally, an Li ion is disposed somewhat in a zigzag. The size of the tunnel T is determined by the size of the corner element and the central element of each of the polyhedrons. In the second embodiment, it is conceived that part of the S element as the corner element of the polyhedrons is substituted with small-sized O element, so that a tunnel size for allowing easy conduction of an Li ion is formed and ion conductivity of the sulfide solid electrolyte material is improved.

The sulfide solid electrolyte material of the second embodiment is greatly characterized by comprising the above-mentioned crystal structure as the main body. The ratio of the above-mentioned crystal structure in the whole crystal structure of the sulfide solid electrolyte material is not particularly limited but is preferably higher. The reason therefor is to allow the sulfide solid electrolyte material with high ion conductivity. The ratio of the above-mentioned crystal structure is, specifically, preferably 70 wt % or more, and more preferably 90 wt % or more. Incidentally, the ratio of the above-mentioned crystal structure may be measured by radiated light XRD, for example. In particular, the sulfide solid electrolyte material of the second embodiment is preferably a single-phase material of the above-mentioned crystal structure. The reason therefor is to allow ion conductivity to be extremely heightened.

Incidentally, the $M_1$ element, the $M_2$ element (the $M_{2a}$ element and the $M_{2b}$ element), and other items in the second embodiment are the same as the above-mentioned first embodiment; therefore, the description here is omitted.

B. Battery

Next, a battery of the present invention is described. The battery of the present invention is a battery comprising a cathode active material layer containing a cathode active material, an anode active material layer containing an anode active material, and an electrolyte layer formed between the above-mentioned cathode active material layer and the above-mentioned anode active material layer, characterized in that at least one of the above-mentioned cathode active material layer, the above-mentioned anode active material layer and the above-mentioned electrolyte layer contains the above-mentioned sulfide solid electrolyte material.

According to the present invention, the use of the above-mentioned sulfide solid electrolyte material allows the high-output battery.

Figure 4:
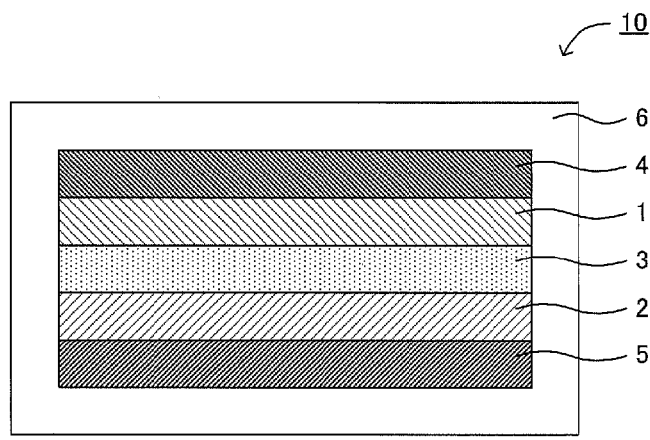
FIG. 4 is a schematic cross-sectional view showing an example of a battery of the present invention.

FIG. 4 is a schematic cross-sectional view showing an example of the battery of the present invention. A battery 10 shown in FIG. 4 comprises a cathode active material layer 1 containing a cathode active material, an anode active material layer 2 containing an anode active material, an electrolyte layer 3 formed between the cathode active material layer 1 and the anode active material layer 2, a cathode current collector 4 for collecting the cathode active material layer 1, an anode current collector 5 for collecting the anode active material layer 2, and a battery case 6 for storing these members. In the present invention, at least one of the cathode active material layer 1, the anode active material layer 2 and the electrolyte layer 3 is greatly characterized by containing the sulfide solid electrolyte material described in the above-mentioned 'A. Sulfide solid electrolyte material'.

The battery of the present invention is hereinafter described in each constitution.

1. Electrolyte Layer

The electrolyte layer in the present invention is a layer formed between the cathode active material layer and the anode active material layer. The electrolyte layer is not particularly limited if the layer is a layer such as to allow ion conduction, but is preferably a solid electrolyte layer composed of a solid electrolyte material. The reason therefor is to allow the battery with high safety as compared with a battery using a liquid electrolyte. In addition, in the present invention, a solid electrolyte layer preferably contains the above-mentioned sulfide solid electrolyte material. The ratio of the above-mentioned sulfide solid electrolyte material contained in a solid electrolyte layer is preferably, for example, within a range of 10% by volume to 100% by volume, above all, within a range of 50% by volume to 100% by volume. In particular, in the present invention, a solid electrolyte layer is preferably composed of only the above-mentioned sulfide solid electrolyte material. The reason therefor is to allow the high-output battery. The thickness of a solid electrolyte layer is preferably within a range of 0.1 µm to 1000 µm, for example, and within a range of 0.1 µm to 300 µm, above all. Also, examples of a method for forming a solid electrolyte layer include a method for compression-molding a solid electrolyte material.

Also, the electrolyte layer in the present invention may be a layer composed of a liquid electrolyte. The case of using a liquid electrolyte allows the higher-output battery though safety needs to be further considered as compared with the case of using a solid electrolyte layer. Also, in this case, ordinarily, at least one of the cathode active material layer and the anode active material layer contains the above-mentioned sulfide solid electrolyte material. A liquid electrolyte ordinarily contains a lithium salt and an organic solvent (a non-aqueous solvent). Examples of the lithium salt include inorganic lithium salts such as $LiPF_6$, $LiBF_4$, $LiClO_4$ and $LiAsF_6$, and organic lithium salts such as $LiCF_3SO_3$, $LiN(CF_3SO_2)_2$, $LiN(C_2F_5SO_2)_2$ and $LiC(CF_3SO_2)_3$. Examples of the above-mentioned organic solvent include ethylene carbonate (EC), propylene carbonate (PC), dimethyl carbonate (DMC), diethyl carbonate (DEC), ethylmethyl carbonate (EMC) and butylene carbonate (BC).

2. Cathode Active Material Layer

The cathode active material layer in the present invention is a layer containing at least a cathode active material, and may contain at least one of a solid electrolyte material, a conductive material and a binder, as required. In particular, in the present invention, the cathode active material layer contains a solid electrolyte material, which is preferably the above-mentioned sulfide solid electrolyte material. The reason therefor is to allow the cathode active material layer with high ion conductivity. The ratio of the above-mentioned sulfide solid electrolyte material contained in the cathode active material layer varies with kinds of a battery and is preferably, for example, within a range of 0.1% by volume to 80% by volume, above all, within a range of 1% by volume to 60% by volume, and particularly, within a range of 10% by volume to 50% by volume. Also, examples of a cathode active material include $LicoO_2$, $LiMnO_2$, $Li_2NiMn_3O_8$, $LiVO_2$, $LiCrO_2$, $LiFePO_4$, $LiCoPO_4$, $LiNiO_2$ and $LiNi_{1/3}Co_{1/3}Mn_{1/3}O_2$.

The cathode active material layer in the present invention may further contain a conductive material. The addition of the conductive material allows conductivity of the cathode active material layer to be improved. Examples of the conductive material include acetylene black, Ketjen Black and carbon fiber. Also, the cathode active material layer may contain a binder. Examples of kinds of the binder include a fluorine-containing binder such as polytetrafluoroethylene (PTFE). Also, the thickness of the cathode active material layer is preferably within a range of 0.1 µm to 1000 µm, for example.

3. Anode Active Material Layer

Next, an anode active material layer in the present invention is described. The anode active material layer in the present invention is a layer containing at least an anode active material, and may contain at least one of a solid electrolyte material, a conductive material and a binder, as required. In particular, in the present invention, the anode active material layer contains a solid electrolyte material, which is preferably the above-mentioned sulfide solid electrolyte material. The reason therefor is to allow the anode active material layer with high ion conductivity. The ratio of the above-mentioned sulfide solid electrolyte material contained in the anode active material layer varies with kinds of a battery and is preferably, for example, within a range of 0.1% by volume to 80% by volume, above all, within a range of 1% by volume to 60% by volume, and particularly, within a range of 10% by volume to 50% by volume. Also, examples of an anode active material include a metal active material and a carbon active material. Examples of the metal active material include In, Al, Si, and Sn. On the other hand, examples of the carbon active material include mesocarbon microbeads (MCMB), high orientation property graphite (HOPG), hard carbon and soft carbon. Incidentally, a conductive material and a binder used for the anode active material layer are the same as the case of the above-mentioned cathode active material layer. Also, the thickness of the anode active material layer is preferably within a range of 0.1 µm to 1000 µm, for example.

4. Other Constitutions

The battery of the present invention comprises at least the above-mentioned electrolyte layer, cathode active material layer and anode active material layer, ordinarily further comprising a cathode current collector for collecting the cathode active material layer and an anode current collector for collecting the anode active material layer. Examples of a material for the cathode current collector include SUS, aluminum, nickel, iron, titanium and carbon, and preferably SUS among them. On the other hand, examples of a material for the anode current collector include SUS, copper, nickel and carbon, and preferably SUS among them. Also, the thickness and shape of the cathode current collector and the anode current collector are preferably selected properly in accordance with factors such as uses of a battery. Also, a battery case of a general battery may be used for a battery case used for the present invention. Examples of the battery case include a battery case made of SUS.

5. Battery

The battery of the present invention may be a primary battery or a secondary battery, and preferably a secondary battery among them. The reason therefor is to be repeatedly charged and discharged and be useful as a car-mounted battery, for example. Examples of the shape of the battery of the present invention include a coin shape, a laminate shape, a cylindrical shape and a rectangular shape. Also, a producing method for the battery of the present invention is not particularly limited if the method is a method such as to allow the above-mentioned battery, but the same method as a producing method for a general battery may be used. For example, in the case where the battery of the present invention is an all solid state battery, examples of a producing method therefor include a method such that a material composing a cathode active material layer, a material composing a solid electrolyte layer and a material composing an anode active material layer are sequentially pressed to thereby produce a power generating element and this power generating element is stored inside a battery case, which is crimped.

C. Producing Method for Sulfide Solid Electrolyte Material

Next, a producing method for a sulfide solid electrolyte material of the present invention is described. The producing method for a sulfide solid electrolyte material of the present invention may be roughly divided into two embodiments. Then, the producing method for a sulfide solid electrolyte material of the present invention is described while divided into a first embodiment and a second embodiment.

1. First Embodiment

The producing method for the sulfide solid electrolyte material of the first embodiment is a producing method for the sulfide solid electrolyte material described in A. Sulfide solid electrolyte material 1. First embodiment', comprising steps of: an ion conductive material synthesizing step of synthesizing an amorphized ion conductive material by mechanical milling while using a raw material composition containing the above-mentioned $M_1$ element, the above-mentioned $M_2$ element, the above-mentioned S element and the above-mentioned O element, and a heating step of obtaining the above-mentioned sulfide solid electrolyte material by heating the above-mentioned amorphized ion conductive material.

According to the first embodiment, amorphization is performed in the ion conductive material synthesizing step to thereafter perform the heating step, so as to allow the sulfide solid electrolyte material such that the ratio of a crystal phase having a peak in the vicinity of $2\theta=29.58°$ is high. Thus, the sulfide solid electrolyte material with favorable ion conductivity may be obtained. In addition, the inclusion of the O element in the raw material composition allows the sulfide solid electrolyte material with ion conductivity further improved.

Figure 5:
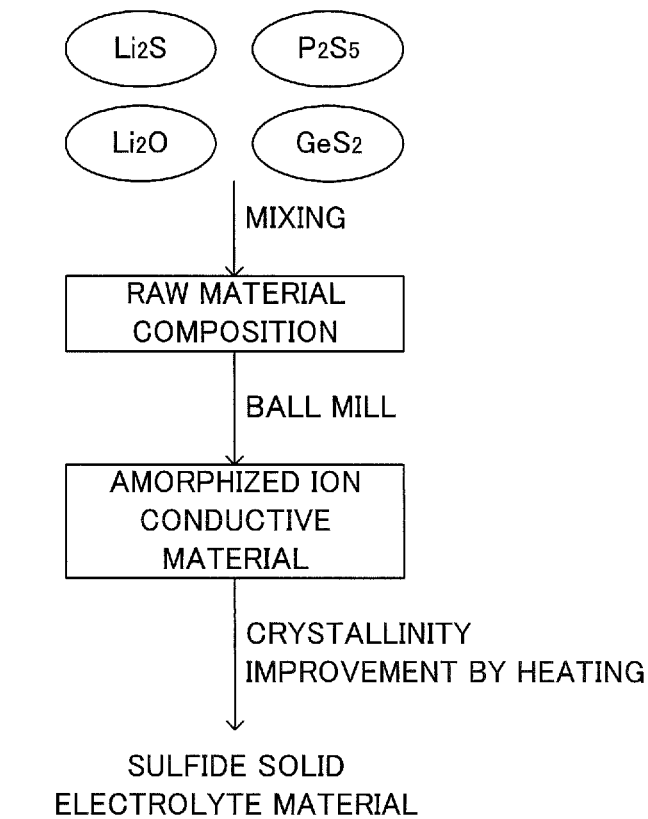
FIG. 5 is an explanatory view showing an example of a producing method for a sulfide solid electrolyte material of the present invention.

FIG. 5 is an explanatory view showing an example of the producing method for the sulfide solid electrolyte material of the first embodiment. In the producing method for the sulfide solid electrolyte material in FIG. 5, first, a raw material composition is produced by mixing $Li_2S$, $Li_2O$, $P_2S_5$ and $GeS_2$. On this occasion, in order to prevent the raw material composition from being deteriorated due to moisture in the air, the raw material composition is preferably produced under an inert gas atmosphere. Next, ball mill is performed for the raw material composition to obtain an amorphized ion conductive material. Next, the amorphized ion conductive material is heated for improving crystallinity to thereby obtain a sulfide solid electrolyte material.

The first embodiment allows the sulfide solid electrolyte material such that the ratio of a crystal phase having a peak in the vicinity of $2\theta=29.58°$ is high; below, the reason therefor is described. In the first embodiment, the amorphized ion conductive material is once synthesized unlike a solid-phase method as a conventional synthesis method. Thus, it is conceived that an environment such that the crystal phase A with high ion conductivity (the crystal phase having a peak in the vicinity of $2\theta=29.58°$) is easily precipitated is brought and the crystal phase A may be precipitated so positively by the heating step thereafter as to allow a value of $I_B/I_A$ to become less than 0.50, which has been conventionally impossible. The reason why an environment such that the crystal phase A is easily precipitated is brought by amorphizing is not completely clear, but it is conceived that there is a possibility that a solution range in the ion conductive material is changed by mechanical milling and an environment such that the crystal phase A is precipitated with difficulty changes into an environment such that the crystal phase A is easily precipitated.

The producing method for the sulfide solid electrolyte material of the first embodiment is hereinafter described in each step.

(1) Ion Conductive Material Synthesizing Step

First, an ion conductive material synthesizing step in the first embodiment is described. The ion conductive material synthesizing step in the first embodiment is a step of synthesizing an amorphized ion conductive material by mechanical milling while using a raw material composition containing the above-mentioned $M_1$ element, the above-mentioned $M_2$ element, the above-mentioned S element and the above-mentioned O element.

The raw material composition in the first embodiment is not particularly limited if the raw material composition is such as to contain the $M_1$ element, the $M_2$ element, the S element and the O element. Incidentally, the $M_1$ element and the $M_2$ element in the raw material composition are the same as the items described in the above-mentioned 'A. Sulfide solid electrolyte material'. A compound containing the $M_1$ element is not particularly limited but examples thereof include a simple substance of $M_1$ and a sulfide of $M_1$. Examples of the sulfide of $M_1$ include $Li_2S$, $Na_2S$, $K_2S$, $MgS$, $CaS$ and $ZnS$. A compound containing $M_2$ element is not particularly limited but examples thereof include a simple substance of $M_2$ and a sulfide of $M_2$. Examples of the sulfide of $M_2$ include $Me_2S_3$ (Me is a trivalent element such as Al, B, Ga, In and Sb), $NeS_2$ (Me is a tetravalent element such as Ge, Si, Sn, Zr, Ti and Nb) and $Me_2S_5$ (Me is a pentavalent element such as P and V).

A compound containing the S element is not particularly limited but may be a simple substance or a sulfide. Examples of the sulfide include a sulfide containing the above-mentioned $M_1$ element or $M_2$ element. A compound containing the O element is ordinarily an oxide. Kinds of the oxide are not particularly limited but are preferably an oxide containing the above-mentioned $M_1$ element or $M_2$ element. The reason therefor is not to produce an unnecessary side reaction. Examples of the above-mentioned oxide include $Me_2O_3$ (Me is a trivalent element such as Al, B, Ga, In and Sb), $MeO_2$ (Me is a tetravalent element such as Ge, Si, Sn, Zr, Ti and Nb), $Me_2O_5$ (Me is a pentavalent element such as P and V), $Li_5MeO_4$ (Me is a trivalent element such as Al, B, Ga, In and Sb), $Li_4MeO_4$ (Me is a tetravalent element such as Ge, Si, Sn, Zr, Ti and Nb) and $Li_3MeO_4$ (Me is a pentavalent element such as P and V).

In addition, the raw material composition preferably has a composition of $Li_{(4-x)}Ge_{(1-x)}P_x(S_{1-y}O_y)$ ("x" satisfies $0<x<1$ and "y" satisfies $0<y\leq0.25$). The reason therefor is to allow the sulfide solid electrolyte material with high ion conductivity. Incidentally, as described above, a composition of $Li_{(4-x)}Ge_{(1-x)}P_xS_4$ not having O element corresponds to a composition of a solid solution of $Li_3PS_4$ and $Li_4GeS_4$. Here, in consideration of the case where the raw material composition contains $Li_2S$, $P_2S_5$ and $GeS_2$, the ratio of $Li_2S$ and $P_2S_5$ such as to allow $Li_3PS_4$ is $Li_2S:P_2S_5=75:25$ on a molar basis. On the other hand, the ratio of $Li_2S$ and $GeS_2$ such as to allow $Li_4GeS_4$ is $Li_2S:GeS_2=66.7:33.3$ on a molar basis. Thus, the used amount of $Li_2S$, $P_2S_5$ and $GeS_2$ is preferably determined in consideration of these ratios. Also, a preferable range of "x" and "y" is the same as the contents described in the above-mentioned 'A. Sulfide solid electrolyte material'.

In addition, the raw material composition preferably has a composition of $Li_{(4-x)}Si_{(1-x)}P_x(S_{1-y}O_y)_4$ ("x" satisfies 0<x<1 and "y" satisfies 0<y≤0.25). The reason therefor is to allow the sulfide solid electrolyte material with high ion conductivity. Incidentally, as described above, a composition of $Li_{(4-x)}Si_{(1-x)}P_xS_4$ not having O element corresponds to a composition of a solid solution of $Li_3PS_4$ and $Li_4SiS_4$. Here, in consideration of the case where the raw material composition contains $Li_2S$, $P_2S_5$ and $SiS_2$, the ratio of $Li_2S$ and $P_2S_5$ such as to allow $Li_3PS_4$ is $Li_2S:P_2S_5=75:25$ on a molar basis. On the other hand, the ratio of $Li_2S$ and $SiS_2$ such as to allow $Li_4SiS_4$ is $Li_2S:SiS_2=66.7:33.3$ on a molar basis. Thus, the used amount of $Li_2S$, $P_2S_5$ and $SiS_2$ is preferably determined in consideration of these ratios. Also, a preferable range of "x" and "y" is the same as the contents described in the above-mentioned 'A. Sulfide solid electrolyte material'.

Mechanical milling is a method for grinding a test sample while allowing mechanical energy thereto. In the first embodiment, an amorphized ion conductive material is synthesized by allowing mechanical energy to the raw material composition. Examples of such mechanical milling include vibrating mill, ball mill, turbo mill, mechano-fusion and disk mill; and among them, preferably vibrating mill and ball mill.

The conditions of vibrating mill are not particularly limited if the conditions are such as to allow an amorphized ion conductive material. The vibration amplitude of vibrating mill is preferably, for example, within a range of 5 mm to 15 mm, and above all, within a range of 6 mm to 10 mm. The vibration frequency of vibrating mill is preferably, for example, within a range of 500 rpm to 2000 rpm, and above all, within a range of 1000 rpm to 1800 rpm. The filling factor of a test sample of vibrating mill is preferably, for example, within a range of 1% by volume to 80% by volume, and above all, within a range of 5% by volume to 60% by volume, and particularly, within a range of 10% by volume to 50% by volume. Also, a vibrator (such as a vibrator made of alumina) is preferably used for vibrating mill.

The conditions of ball mill are not particularly limited if the conditions are such as to allow an amorphized ion conductive material. Generally, larger number of revolutions brings higher production rate of the ion conductive material, and longer treating time brings higher conversion ratio of the raw material composition into the ion conductive material. The number of weighing table revolutions in performing planetary ball mill is preferably within a range of 200 rpm to 500 rpm, for example, and within a range of 250 rpm to 400 rpm, above all. Also, the treating time in performing planetary ball mill is preferably within a range of 1 hour to 100 hours, for example, and within a range of 1 hour to 70 hours, above all.

Incidentally, in the first embodiment, the amorphized ion conductive material is preferably synthesized so as to bring an environment such that the crystal phase having a peak in the vicinity of 2θ=29.58° is easily precipitated.

(2) Heating Step

A heating step in the first embodiment is a step of obtaining the above-mentioned sulfide solid electrolyte material by heating the above-mentioned amorphized ion conductive material.

In the first embodiment, the improvement of crystallinity is intended by heating the amorphized ion conductive material. This heating allows the crystal phase A with high ion conductivity (the crystal phase having a peak in the vicinity of 2θ=29.58° to be precipitated so positively as to allow a value of $I_B/I_A$ to become less than 0.50, which has been conventionally impossible.

The heating temperature in the first embodiment is not particularly limited if the heating temperature is a temperature such as to allow a desired sulfide solid electrolyte material, but is preferably a temperature of crystallization temperature or more of the crystal phase A (the crystal phase having a peak in the vicinity of 2θ=29.58°). Specifically, the above-mentioned heating temperature is preferably 300° C. or more, more preferably 350° C. or more, far more preferably 400° C. or more, and particularly preferably 450° C. or more. On the other hand, the above-mentioned heating temperature is preferably 1000° C. or less, more preferably 700° C. or less, far more preferably 650° C. or less, and particularly preferably 600° C. or less. Also, the heating time is preferably adjusted properly so as to allow a desired sulfide solid electrolyte material. Also, heating in the first embodiment is preferably performed under an inert gas atmosphere or in a vacuum from the viewpoint of preventing oxidation. Also, the sulfide solid electrolyte material obtained by the first embodiment is the same as the contents described in the above-mentioned 'A. Sulfide solid electrolyte material 1. First embodiment'; therefore, the description here is omitted.

2. Second Embodiment

The producing method for the sulfide solid electrolyte material of the second embodiment is a producing method for the sulfide solid electrolyte material described in 'A. Sulfide solid electrolyte material 2. Second embodiment', comprising steps of: an ion conductive material synthesizing step of synthesizing an amorphized ion conductive material by mechanical milling while using a raw material composition containing the above-mentioned $M_1$ element, the above-mentioned $M_{2a}$ element, the above-mentioned $M_{2b}$ element, the above-mentioned S element and the above-mentioned O element, and a heating step of obtaining the above-mentioned sulfide solid electrolyte material by heating the above-mentioned amorphized ion conductive material.

According to the second embodiment, amorphization is performed in the ion conductive material synthesizing step to thereafter perform the heating step, so as to allow the sulfide solid electrolyte material such that the octahedron O, the tetrahedron $T_1$ and the tetrahedron $T_2$ have a predetermined crystal structure (a three-dimensional structure). Thus, the sulfide solid electrolyte material with favorable ion conductivity may be obtained. In addition, the inclusion of the O element in the raw material composition allows the sulfide solid electrolyte material with ion conductivity further improved.

The ion conductive material synthesizing step and the heating step in the second embodiment are basically the same as the contents described in the above-mentioned 'C. Producing method for sulfide solid electrolyte material 1. First embodiment'; therefore, the description here is omitted. Various kinds of conditions are preferably determined so as to allow a desired sulfide solid electrolyte material.

Incidentally, the present invention is not limited to the above-mentioned embodiments. The above-mentioned embodiments are exemplification, and any is included in the technical scope of the present invention if it has substantially the same constitution as the technical idea described in the claim of the present invention and offers similar operation and effect thereto.

EXAMPLES

The present invention is described more specifically while showing examples hereinafter.

Example 1

Lithium sulfide ($Li_2S$), lithium oxide ($Li_2O$), phosphorus pentasulfide ($P_2S_5$) and germanium sulfide ($GeS_2$) were used as a starting material. These powders were mixed in a glove box under an argon atmosphere at a ratio of 0.3495 g of $Li_2S$, 0.03082 g of $Li_2O$, 0.372641 g of $P_2S_5$ and 0.2469 g of $GeS_2$ to obtain a raw material composition. The obtained raw material composition was ground by using vibrating mill. TI-100™ manufactured by Cosmic Mechanical Technology Co., Ltd. was used for vibrating mill. Specifically, 1 g of the raw material composition and a vibrator made of alumina (φ36.3 mm, height 48.9 mm) were put in a 10-mL pot and treated at the number of revolutions of 1440 rpm for 30 minutes. Thus, an amorphized ion conductive material having a composition of $Li_{3.35}Ge_{0.35}P_{0.65}(S_{0.95}O_{0.05})_4$ was obtained.

Next, the obtained ion conductive material was molded into pellets, and the obtained pellets were put in a carbon-coated quartz tube and vacuum-sealed. The pressure of the quartz tube for vacuum-sealing was approximately 30 Pa. Next, the quartz tube was placed in a burning furnace, heated from room temperature to 550° C. over 6 hours, maintained at 550° C. for 8 hours, and thereafter slowly cooled up to room temperature. Thus, a crystalline sulfide solid electrolyte material having a composition of $Li_{3.35}Ge_{0.35}P_{0.65}(S_{0.95}O_{0.05})_4$ was obtained. Incidentally, the above-mentioned composition corresponds to a composition of x=0.65 and y=0.05 in $Li_{(4-x)}Ge_{(1-x)}P_x(S_{1-y}O_y)_4$. The oxygen amount substituted is 5%.

Example 2

A crystalline sulfide solid electrolyte material was obtained in the same manner as Example 1 except for using a mixture at a ratio of 0.30728 g of $Li_2S$, 0.06269 g of $Li_2O$, 0.378922 g of $P_2S_5$ and 0.251096 g of $GeS_2$ as a raw material composition. The obtained sulfide solid electrolyte material has a composition of $Li_{3.35}Ge_{0.35}P_{0.65}(S_{0.9}O_{0.1})_4$, which corresponds to a composition of x=0.65 and y=0.1 in $Li_{(4-x)}Ge_{(1-x)}P_x(S_{1-y}O_y)_4$. The oxygen amount substituted is 10%.

Example 3

A crystalline sulfide solid electrolyte material was obtained in the same manner as Example 1 except for using a mixture at a ratio of 0.190304 g of $Li_2S$, 0.150803 g of $Li_2O$, 0.3962890 g of $P_2S_5$ and 0.262604 g of $GeS_2$ as a raw material composition. The obtained sulfide solid electrolyte material has a composition of $Li_{3.35}Ge_{0.35}P_{0.65}(S_{0.77}O_{0.23})_4$, which corresponds to a composition of x=0.65 and y=0.23 in $Li_{(4-x)}Ge_{(1-x)}P_x(S_{1-y}O_y)_4$. The oxygen amount substituted is 23%.

Comparative Example 1

A crystalline sulfide solid electrolyte material was obtained in the same manner as Example 1 except for using a mixture at a ratio of 0.390529 g of $Li_2S$, 0.366564 g of $P_2S_5$ and 0.242907 g of $GeS_2$ as a raw material composition. The obtained sulfide solid electrolyte material has a composition of $Li_{3.35}Ge_{0.35}P_{0.65}S_4$, which corresponds to a composition of x=0.65 and y=0 in $Li_{(4-x)}Ge_{(1-x)}P_x(S_{1-y}O_y)_4$. The oxygen amount substituted is 0%.

[Evaluations 1]

(X-Ray Diffraction Measurement)

Figure 6:
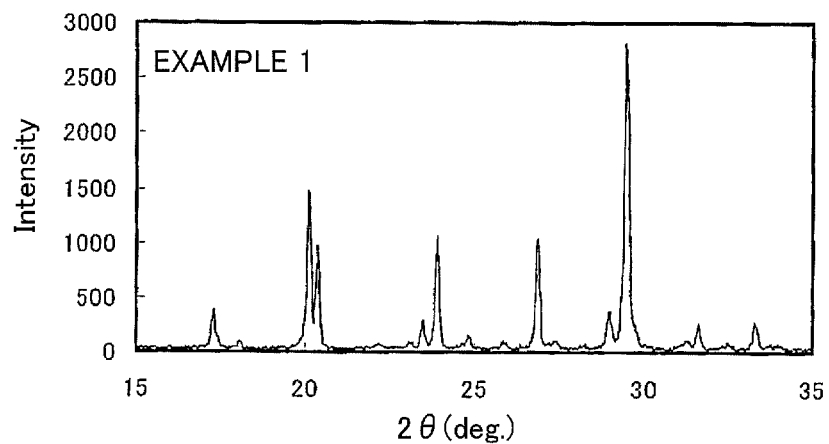
FIG. 6 is an X-ray diffraction spectrum of a sulfide solid electrolyte material obtained in Example 1.
Figure 7:
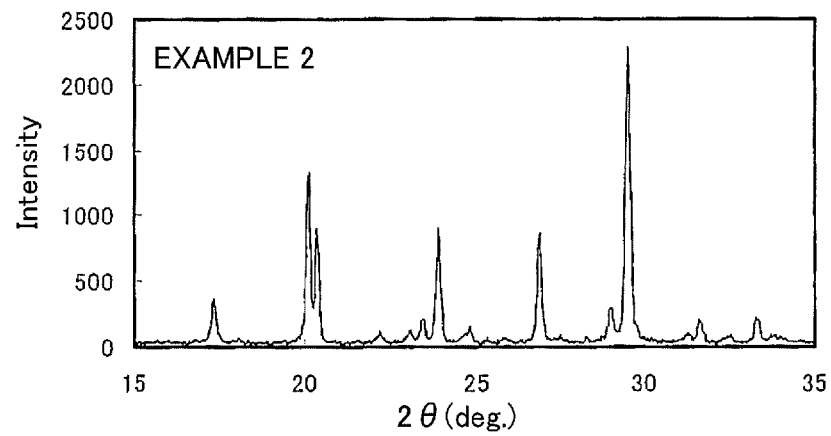
FIG. 7 is an X-ray diffraction spectrum of a sulfide solid electrolyte material obtained in Example 2.
Figure 8:
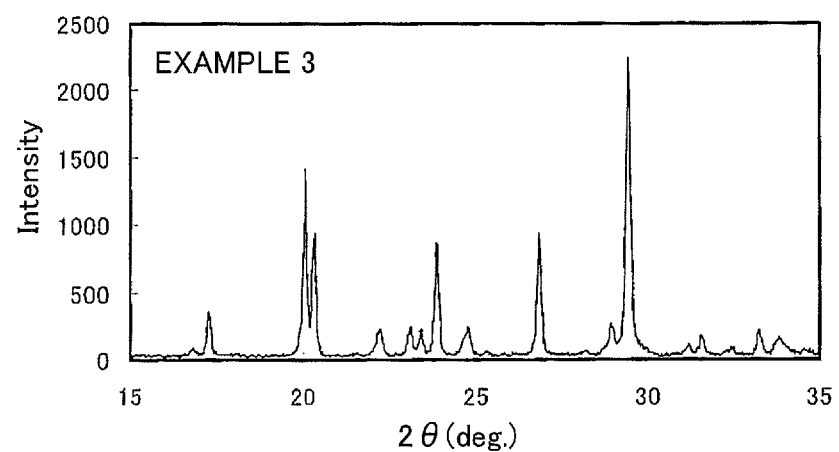
FIG. 8 is an X-ray diffraction spectrum of a sulfide solid electrolyte material obtained in Example 3.
Figure 9:
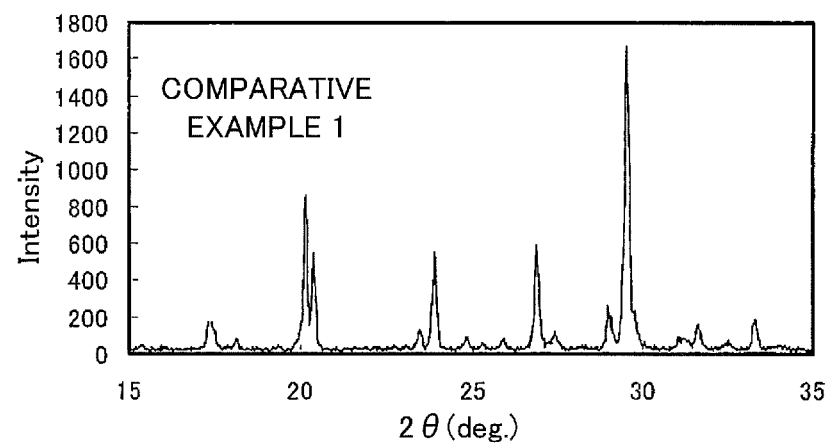
FIG. 9 is an X-ray diffraction spectrum of a sulfide solid electrolyte material obtained in Comparative Example 1.

X-ray diffraction (XRD) measurement was performed while using the sulfide solid electrolyte material obtained in Examples 1 to 3 and Comparative Example 1. XRD measurement was performed for a powder sample under an inert atmosphere on the conditions of using a CuKα ray. The results are shown in FIGS. 6 to 9. As shown in FIG. 9, the single-phase sulfide solid electrolyte material was obtained in Comparative Example 1. The position of a peak was 2θ=17.38°, 20.18°, 20.44°, 23.56°, 23.96°, 24.93°, 26.96°, 29.07°, 29.58°, 31.71°, 32.66° and 33.39°. That is to say, these peaks are conceived to be the peaks of the crystal phase A with high ion conductivity. Incidentally, the peak of 2θ=27.33°±0.50° as the peak of the crystal phase B with low ion conductivity was not confirmed. Also, as shown in FIGS. 6 to 8, it was confirmed that Examples 1 to 3 had the same diffraction pattern as Comparative Example 1.

(X-Ray Structural Analysis)

The crystal structure of the sulfide solid electrolyte material obtained in Comparative Example 1 was identified by X-ray structural analysis. The crystal system and crystallographic group were determined by a direct method on the basis of a diffraction pattern obtained in XRD to thereafter identify the crystal structure by a real space method. As a result, it was confirmed that the sulfide solid electrolyte material had the above-mentioned crystal structure as shown in FIGS. 2 and 3. That is to say, the crystal structure was such that the tetrahedron $T_1$ ($GeS_4$ tetrahedron and $PS_4$ tetrahedron) and the octahedron O ($LiS_6$ octahedron) shared an edge, and the tetrahedron $T_2$ ($PS_4$ tetrahedron) and the octahedron O ($LiS_6$ octahedron) shared a corner. Also, as described above, Examples 1 to 3 had the same diffraction pattern as Comparative Example 1, so that it was confirmed that the same crystal structure was formed in Examples 1 to 3.

(Measurement of Li Ion Conductance)

Li ion conductance at a temperature of 25° C. was measured while using the sulfide solid electrolyte material obtained in Examples 1 to 3 and Comparative Example 1. First, a test sample was weighed by a suitable amount in a glove box of an argon atmosphere, put in a polyethylene terephthalate tube (a PET tube, an inside diameter of 10 mm, an outside diameter of 30 mm, a height of 20 mm), and held between powder molding jigs made of carbon tool steel S45C anvil from the top and bottom. Next, the test sample was pressed at an indicating pressure of 6 MPa (a molding pressure of approximately 110 MPa) by using a uniaxial pressing machine (P-6™ manufactured by Rikenseiki Co., Ltd.), and molded into pellets with a diameter of 10 mm and an optional thickness. Next, gold powder (manufactured by The Nilaco Corporation, treelike, a particle diameter of approximately 10 μm) was mounted by 13 mg to 15 mg on both sides of the pellets, and dispersed uniformly on the surface of the pellets, which were molded at an indicating pressure of 30 MPa (a molding pressure of approximately 560 MPa). Thereafter, the obtained pellets were put in a closed electrochemical cell which may maintain an argon atmosphere.

An impedance gain-phase analyzer manufactured by Solartron Inc. (solartron 1260™) was used for the measurement as FRA (Frequency Response Analyzer), and a small-sized environmental tester (Espec corp, SU-241™, −40° C. to 150° C.) was used as a constant temperature unit. The measurement was started from a high-frequency range on the conditions of an alternating voltage of 10 mV to 1000 mV, a frequency range of 1 Hz to 10 MHz, an integration time of 0.2 second, and a temperature of 23° C. Zplot™ was used for measurement software and Zview™ was used for analysis software. The obtained results are shown in FIG. 10.

Figure 10:
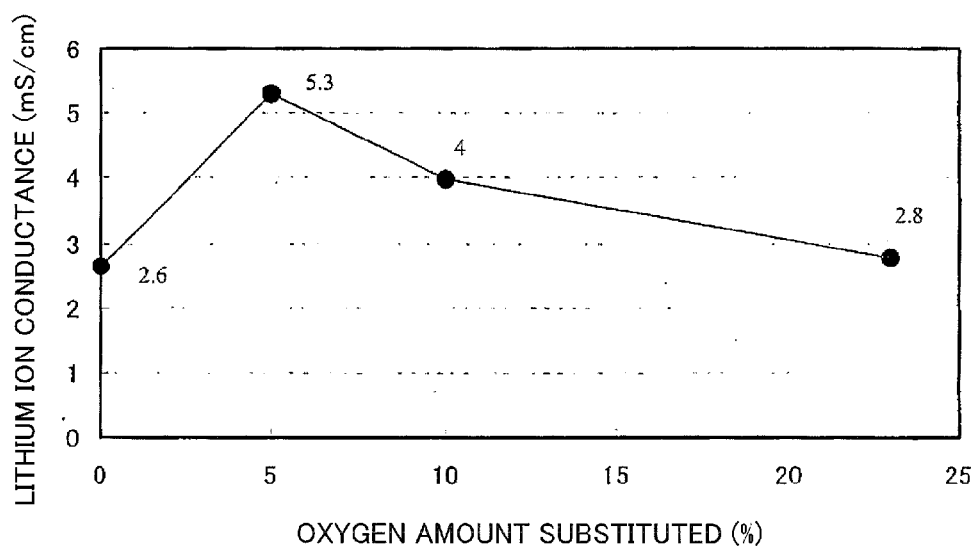
FIG. 10 is a result of measuring Li ion conductance of a sulfide solid electrolyte material obtained in each of Examples 1 to 3 and Comparative Example 1.
Figure 11:
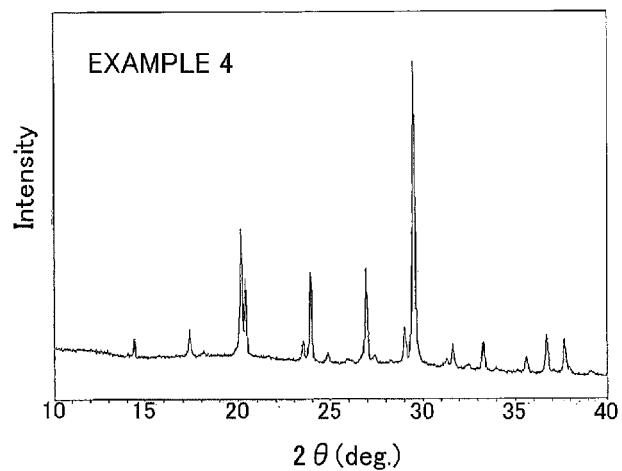
FIG. 11 is an X-ray diffraction spectrum of a sulfide solid electrolyte material obtained in Example 4.
Figure 12:
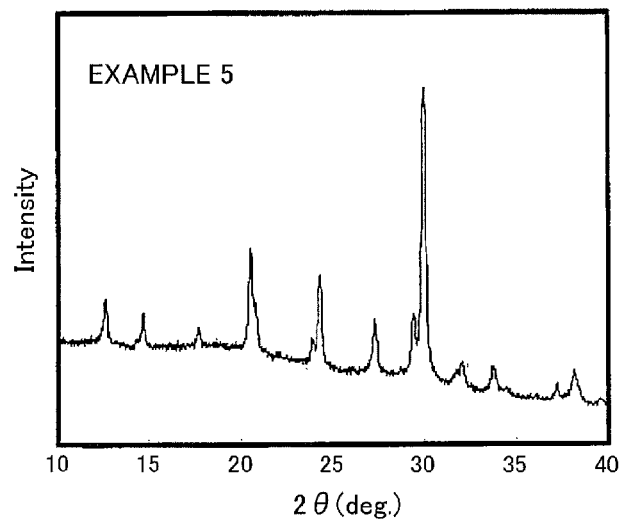
FIG. 12 is an X-ray diffraction spectrum of a sulfide solid electrolyte material obtained in Example 5.
Figure 13:
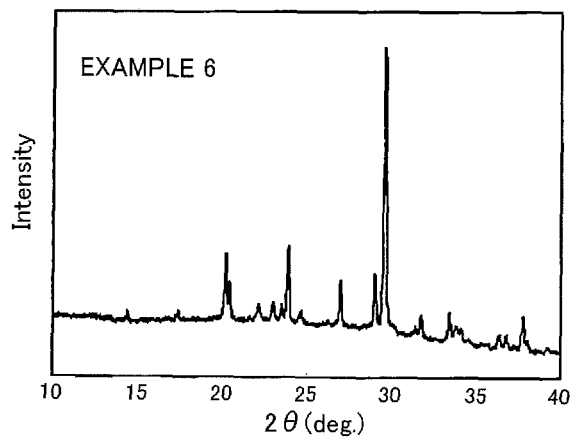
FIG. 13 is aft X-ray diffraction spectrum of a sulfide solid electrolyte material obtained in Example 6.
Figure 14:
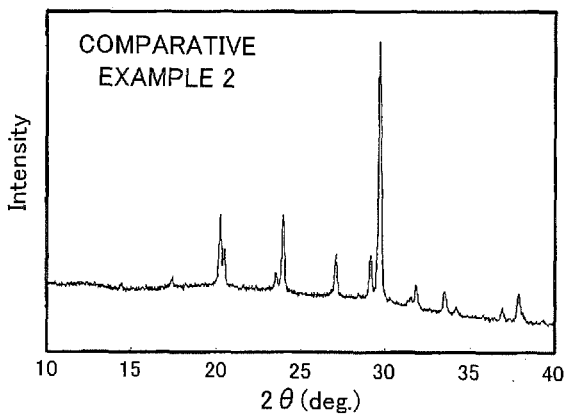
FIG. 14 is an X-ray diffraction spectrum of a sulfide solid electrolyte material obtained in Comparative Example 2.

As shown in FIG. 10, it was confirmed that Li ion conductance was high in Examples 1 to 3 such that sulfur was substituted with oxygen as compared with Comparative Example 1 such that sulfur was not substituted with oxygen. The reason why Li ion conductance of the sulfide solid electrolyte material obtained in Examples 1 to 3 is high is conceived to be that the introduction of the O element causes the size of a tunnel through which an Li ion passes (a tunnel existing in a crystal) to change into a size for allowing easier conduction.

Example 4

Lithium sulfide ($Li_2S$, manufactured by Nippon Chemical Industrial Co., Ltd.), lithium oxide ($Li_2O$, manufactured by Kojundo Chemical Lab. Co., Ltd.), phosphorus pentasulfide ($P_2S_5$, manufactured by Sigma-Aldrich Co. LLC.) and silicon sulfide ($SiS_2$, manufactured by Kojundo Chemical Lab. Co., Ltd.) were used as a starting material. These powders were mixed in a glove box under an argon atmosphere at a ratio of 0.34083 g of $Li_2S$, 0.06819 g of $Li_2O$, 0.38049 g of $P_2S_5$ and 0.21047 g of $SiS_2$ to obtain a raw material composition. Next, 1 g of the raw material composition was put in a pot made of zirconia (45 ml) together with zirconia ball (10 mmφ, 10 pieces) to hermetically seal the pot completely (an argon atmosphere). This pot was mounted on a planetary ball milling machine (P7™ manufactured by Fritsch Japan Co., Ltd.) to perform mechanical milling for 40 hours at the number of weighing table revolutions of 370 rpm. Thus, an amorphized ion conductive material was obtained.

Next, powder of the obtained ion conductive material was put in a carbon-coated quartz tube and vacuum-sealed. The pressure of the quartz tube for vacuum-sealing was approximately 30 Pa. Next, the quartz tube was placed in a burning furnace, heated from room temperature to 550° C. over 6 hours, maintained at 550° C. for 8 hours, and thereafter slowly cooled up to room temperature. Thus, a crystalline sulfide solid electrolyte material having a composition of $Li_{3.4}Si_{0.4}P_{0.6}(S_{0.9}O_{0.1})_4$ was obtained. Incidentally, the above-mentioned composition corresponds to a composition of x=0.6 and y=0.1 in $Li_{(4-x)}Si_{(1-x)}P_x(S_{1-y}O_y)_4$. The oxygen amount substituted is 10%.

Example 5

A crystalline sulfide solid electrolyte material was obtained in the same manner as Example 4 except for using a mixture at a ratio of 0.386186 g of $Li_2S$, 0.03348565 g of $Li_2O$, 0.373641747 g of $P_2S_5$ and 0.2066865 g of $SiS_2$ as a raw material composition. The obtained sulfide solid electrolyte material has a composition of $Li_{3.4}Si_{0.4}P_{0.6}(S_{0.95}O_{0.05})_4$, which corresponds to a composition of x=0.6 and y=0.05 in $Li_{(4-x)}Si_{(1-x)}P_x(S_{1-y}O_y)_4$. The oxygen amount substituted is 5%.

Example 6

A crystalline sulfide solid electrolyte material was obtained in the same manner as Example 4 except for using a mixture at a ratio of 0.2449428 g of $Li_2S$, 0.141591 g of $Li_2O$, 0.3949774 g of $P_2S_5$ and 0.21848871 g of $SiS_2$ as a raw material composition. The obtained sulfide solid electrolyte material has a composition of $Li_{3.4}Si_{0.4}P_{0.6}(S_{3.8}O_{0.2})_4$, which corresponds to a composition of x=0.6 and y=0.2 in $Li_{(4-x)}Si_{(1-x)}P_x(S_{1-y}O_y)_4$. The oxygen amount substituted is 20%.

Comparative Example 2

A crystalline sulfide solid electrolyte material was obtained in the same manner as Example 4 except for using a mixture at a ratio of 0.429936 g of $Li_2S$, 0.367033 g of $P_2S_5$ and 0.203030 g of $SiS_2$ as a raw material composition. The obtained sulfide solid electrolyte material has a composition of $Li_{3.4}Si_{0.4}P_{0.6}S_4$, which corresponds to a composition of x=0.6 and y=0 in $Li_{(4-x)}Si_{(1-x)}P_x(S_{1-y}O_y)_4$. The oxygen amount substituted is 0%.

[Evaluations 2]
(X-Ray Diffraction Measurement)

X-ray diffraction (XRD) measurement was performed while using the sulfide solid electrolyte material obtained in Examples 4 to 6 and Comparative Example 2. XRD measurement was performed for a powder sample under an inert atmosphere on the conditions of using a CuKα ray. The results are shown in FIGS. 11 to 14. As shown in FIGS. 11 to 14, it was confirmed that Examples 4 to 6 and Comparative Example 2 had the same diffraction pattern as the above-mentioned Comparative Example 1.

(Measurement of Li Ion Conductance)

Figure 15:
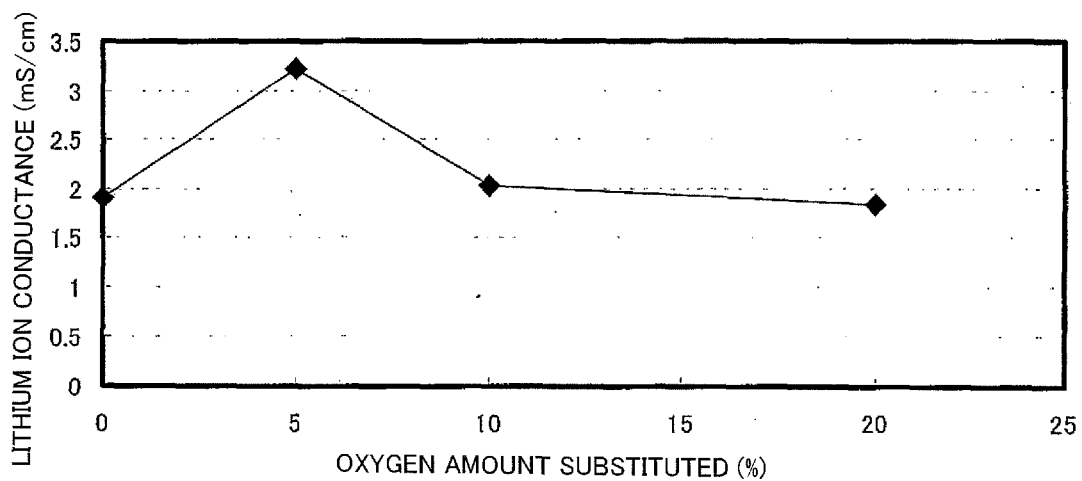
FIG. 15 is a result of measuring Li ion conductance of a sulfide solid electrolyte material obtained in each of Examples 4 to 6 and Comparative Example 2.

Li ion conductance at a temperature of 25° C. was measured while using the sulfide solid electrolyte material obtained in Examples 4 to 6 and Comparative Example 2. The measuring method is the same as the method described in Evaluations 1. The obtained results are shown in FIG. 15. As shown in FIG. 15, it was confirmed that Li ion conductance was equal or high in Examples 4 to 6 such that sulfur was substituted with oxygen as compared with Comparative Example 2 such that sulfur was not substituted with oxygen. The reason why Li ion conductance of the sulfide solid electrolyte material obtained in Examples 1 to 3 is high is conceived to be that the introduction of the O element causes the size of a tunnel through which an Li ion passes (a tunnel existing in a crystal) to change into a size for allowing easier conduction.

REFERENCE SIGNS LIST

1 . . . cathode active material layer
2 . . . anode active material layer
3 . . . electrolyte layer
4 . . . cathode current collector
5 . . . anode current collector
6 . . . battery case
10 . . . battery

The invention claimed is:

1. A sulfide solid electrolyte material comprising an $M_1$ element, an $M_2$ element, a S element and an O element, wherein
the $M_1$ contains at least Li;
the $M_2$ is at least one kind selected from the group consisting of P, Sb, Si, Ge, Sn, B, Al, Ga, In, Ti, Zr, V and Nb; and
having a peak at a position of 2θ=20.18°±0.50°, 2θ=20.44°±0.50°, 2θ=26.96°±0.50° and 2θ=29.58°±0.50° in an X-ray diffraction measurement using a CuKα ray; and
wherein when a diffraction intensity at the peak of 2θ=29.58°±0.50° is regarded as $I_4$ and a diffraction intensity at a peak of $2\theta=27.33°±0.50°$ is regarded as $I_B$, a value of $I_B/I_A$ is less than 0.50.

2. A sulfide solid electrolyte material comprising an $M_1$ element, an $M_2$ element, a S element and an O element, wherein
the $M_1$ contains at least Li; the $M_2$ is at least one kind selected from the group consisting of P, Sb, Si, Ge, Sn, B, Al, Ga, In, Ti, Zr, V and Nb; and
having a peak at a position of $2\theta=20.18°±0.50°$, $2\theta=20.44°±0.50°$, $2\theta=26.96°±0.50°$ and $2\theta=29.58°±0.50°$ in an X-ray diffraction measurement using a CuKα ray; and
wherein the sulfide solid electrolyte material does not have a peak at a position of $2\theta=27.33°±0.50°$ in the X-ray diffraction measurement using the CuKα ray, or wherein when a diffraction intensity at the peak of $2\theta=29.58°±0.50°$ is regarded as $I_A$ and a diffraction intensity at the peak of $2\theta=27.33°±0.50°$ is regarded as $I_B$ in a case the sulfide solid electrolyte material has a peak at the position of $2\theta=27.33°±0.50°$, a value of $I_B/I_A$ is less than 0.50.

3. A sulfide solid electrolyte material having an octahedron O composed of an $M_1$ element and a S element, a tetrahedron $T_1$ composed of an $M_{2a}$ element and a S element, and a tetrahedron $T_2$ composed of an $M_{2b}$ element and a S element,
wherein the tetrahedron $T_1$ and the octahedron O share an edge, the tetrahedron $T_2$ and the octahedron O contain a crystal structure sharing a corner as a main body;
the $M_1$ contains at least Li;
the $M_{2a}$ and the $M_{2b}$ are each independently at least one kind selected from the group consisting of P, Sb, Si, Ge, Sn, B, Al, Ga, In, Ti, Zr, V and Nb; and
at least one of the octahedron O, the tetrahedron $T_1$ and the tetrahedron $T_2$ is such that a part of the S element is substituted with an O element.

4. The sulfide solid electrolyte material according to claim 1, comprising at least a Li element, a Ge element, a P element, the S element and the O element, wherein a ratio of the O element to a total of the S element and the O element is 25% or less.

5. The sulfide solid electrolyte material according to claim 1, comprising at least a Li element, a Si element, a P element, the S element and the O element, wherein a ratio of the O element to a total of the S element and the O element is 10% or less.

6. A battery comprising a cathode active material layer containing a cathode active material, an anode active material layer containing an anode active material, and an electrolyte layer formed between the cathode active material layer and the anode active material layer, wherein at least one of the cathode active material layer, the anode active material layer and the electrolyte layer contains the sulfide solid electrolyte material according to claim 1.

7. A producing method for a sulfide solid electrolyte material, the sulfide solid electrolyte material being the sulfide solid electrolyte material according to claim 1, comprising steps of:
an ion conductive material synthesizing step of synthesizing an amorphized ion conductive material by mechanical milling while using a raw material composition containing the $M_1$ element, the $M_2$ element, the S element and the O element, and
a heating step of obtaining the sulfide solid electrolyte material by heating the amorphized ion conductive material.

8. A producing method for a sulfide solid electrolyte material, the sulfide solid electrolyte material being the sulfide solid electrolyte material according to claim 3, comprising steps of:
an ion conductive material synthesizing step of synthesizing an amorphized ion conductive material by mechanical milling while using a raw material composition containing the $M_1$ element, the $M_{2a}$ element, the $M_{2b}$ element, the S element and the O element, and
a heating step of obtaining the sulfide solid electrolyte material by heating the amorphized ion conductive material.

* * * * *